United States Patent
Li et al.

(10) Patent No.: US 8,418,037 B2
(45) Date of Patent: Apr. 9, 2013

(54) METHOD AND DEVICE FOR DECODING BY USING WINDOW-BASED LEAST SIGNIFICANT BITS IN ROBUST HEADER COMPRESSION

(75) Inventors: Rui Li, Shenzhen (CN); Yun Cao, Shenzhen (CN); Zhixiong Zhou, Shenzhen (CN); Junfeng Liao, Shenzhen (CN); Guoyan Mu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 12/676,142

(22) PCT Filed: Sep. 3, 2007

(86) PCT No.: PCT/CN2007/002629
§ 371 (c)(1),
(2), (4) Date: Mar. 2, 2010

(87) PCT Pub. No.: WO2009/030061
PCT Pub. Date: Mar. 12, 2009

(65) Prior Publication Data
US 2010/0205497 A1    Aug. 12, 2010

(51) Int. Cl.
*H03M 13/00*    (2006.01)
(52) U.S. Cl.
USPC ............................ 714/776; 714/795; 714/702
(58) Field of Classification Search .................. 714/776, 714/775, 795, 792, 701, 702
See application file for complete search history.

(56) References Cited

U.S. PATENT DOCUMENTS

| | | | | |
|---|---|---|---|---|
| 4,349,913 A | * | 9/1982 | Skoog | 375/242 |
| 4,520,491 A | * | 5/1985 | Raulin et al. | 375/245 |
| 4,827,201 A | * | 5/1989 | Ito | 318/603 |
| 5,459,465 A | * | 10/1995 | Kagey | 341/156 |
| 7,331,013 B2 | * | 2/2008 | Rudosky et al. | 714/795 |
| 2005/0117591 A1 | | 6/2005 | Hurtta et al. | |

FOREIGN PATENT DOCUMENTS

| | | |
|---|---|---|
| CN | 1507286 A | 6/2004 |
| CN | 1809052 A | 7/2006 |
| WO | 0232084 A2 | 4/2002 |

OTHER PUBLICATIONS

English Translation of the Written Opinion of the International Search Authority in international application No. PCT/CN20071002629, mailed on Jun. 12, 2008.
International Search Report in international application No. PCT/CN2007/002629, mailed Jun. 12, 2008.
English translation of abstract for CN 1809052.
English translation of abstract for CN 1507286. RObust Header Compression(ROHC): Framework and four profiles: RTP, UDP, ESP, and uncompressed RFC 3095, Jan. 2001.

* cited by examiner

*Primary Examiner* — Fritz Alphonse
(74) *Attorney, Agent, or Firm* — Oppedahl Patent Law Firm LLC

(57) ABSTRACT

A decompression method for communication network is provided, in which such fields as an SN are compressed by using an ROHC scheme. The ROHC uses a WLSB algorithm to compress some fields which change regularly, and decodes by using the decompressor's context through transmitting the low significant bits in these fields. In order to avoid using the inefficient ergodic method and the incorrect direct replacing method in low bits, based on the mathematical characteristics of the definition of interpretation intervals, decoding is performed such that the low bits is determined by the received k significant bits while the high bits is determined jointly by the local storage information and these k significant bits. Its decoding method can be used for decompression of an SN, a TS and an IP-ID in an ROHC compression.

21 Claims, 8 Drawing Sheets

METHOD AND DEVICE FOR DECODING BY USING WINDOW-BASED LEAST SIGNIFICANT BITS IN ROBUST HEADER COMPRESSION

TECHNICAL FIELD

The present invention relates to communication technologies, and more particularly relates to a method and a device for decoding during decompression after header compression in wireless communications.

BACKGROUND

The third generation mobile communication ($3^{rd}$ Generation, shortened as "3G") technology has become one of the communication technologies that attract the highest attention in the world; as a new communication technology, 3G supports not only traditional circuit switching but also packet switching. However, some technologies following 3G, such as B3G (Beyond 3G) and WiMax (Worldwide Interoperability for Microwave Access), etc, have all transformed the focus towards packet switching, i.e. primarily supporting the IP (Internet Protocol, shortened as "IP") technology.

For applications of multimedia such as voice and the like, the IP technology can bring about reduction of costs; when voice is transmitted according to the traditional IP format, however, a voice packet will be carried over RTP (Real-time Transport Protocol, shortened as "RTP") and UDP (User Datagram Protocol, shortened as "UDP") protocols, and relative to a voice data payload, an RTP/UDP/IP message would generate a very large header overhead, and there are a total of 40 bytes in IPv4 (IP Version 4), but there are 60 bytes in IPv6 (IP Version 6), while there are only a dozen of bytes in an actual voice payload, so the utilization efficiency of bandwidth is only about 20%. This would result in a huge waste for wireless air interface resources, while a very big chunk of the operating cost of a communication operator comes from purchase of the right to use radio frequency channels, therefore it would be very disadvantageous to the profitability of the operator if the expensive radio frequency spectrums can not be used efficiently. For this reason, the Internet Engineering Task Force (shortened as "IETF") has introduced a Robust Header Compression (shortened as "ROHC") technology, which can improve the transmission efficiency of network data by compressing the RTP/UDP/IP headers. As a universal IP-based compression technology, the ROHC can be applied in not only to any 3G standard but also such technologies following 3G as B3G and WiMax, and it can be applied in not only base stations and user terminals but also core network segments. The ROHC can compress a 40-byte header down to a 1-byte one at the most, thereby improving the actual utilization efficiency of bandwidth to over 90%.

A fundamental principle of the ROHC protocol is to classify each header field of a message, because during a transmission process of the entire stream, adjacent packets have many invariable parts, such as IP addresses and UDP port numbers, etc, and also have some regular variations, such as an SN (Sequence Number, shortened as "SN") of an RTP header and a TS (Timestamp, shortened as "TS"), etc. The ROHC protocol classifies the message header into a static part and a dynamic part. Each of a compressor and a decompressor saves a piece of context which is relevant information for each data stream. A complete message would be sent by the compressor at the first time, and the decompressor obtains static information and dynamic information by decompressing it, and subsequently, the compressed message would no longer contain the static part of the original message.

For an air interface part, major fields that may change include an RTP header's a Sequence Number (SN), a Timestamp (TS) and an IP fragment identifier IP-ID (IP Identifier, shortened as "IP-ID"). For such multimedia applications as VoIP, the SNs of the adjacent packets are incremented by 1; for the TS, because a sampling value of voice is fixed and an interval between each sent packet is also fixed, the increment of the TS of the sent packet is also fixed, which is set as a stride value (TS-STRIDE), therefore the TSs of the adjacent packets are also incremented by a unit of a fixed TS-STRIDE; if the IP-ID does not select to change in a random increment mode, then it is also incremented by 1 directly in the adjacent packets, so that the values of both the TS and the IP-ID can actually always be directly deduced from the SN.

The ROHC mainly uses a WLSB (Window-Based Least Significant Bits, shortened as "WLSB") algorithm to compress the SN, the TS and the IP-ID. Those values that change insignificantly are compressed by using the WLSB algorithm, a basic idea of this algorithm is to replace the original field value with low-k bits in an original field value to implement transmission, and to save a reference value corresponding to the field into the context of both a compressor and a decompressor, and to restore the original field value by the decompressor based on this reference value, a pre-negotiated shifting value and the k bits received. The algorithm introduces a concept of interpretation intervals to ensure the correctness of the compression and the decompression. The interpretation interval defines an interval of a decoded value, and the compressor selects the low-k bits to send according to a certain rule, while the decompressor searches in the interpretation interval to find the value of the low-k bits which is identical to the received k bits and uses the value as the decoded value.

The ROHC protocol is based on an RFC3095 (Request For Comments, shortened as "RFC") protocol, the RFC3095 specifies that the WLSB compression algorithm defines an interpretation interval based on a reference value "Ref" and a shifting value p as well as the received k-bit m of a receiver; a lower limit of the interpretation interval is Low=Ref−p, and its upper limit is High=Ref+($2^k$−1)−p, wherein, the "^" means exponentiation.

The interpretation interval is a range of values, and a decoded value must fall within the interpretation interval. It can be seen from the definition of the interpretation interval that High=Low+($2^k$−1), i.e. the upper limit "High" is equal to the sum of the lower limit "Low" and "1 . . . 1" (k bits of 1), therefore if the low-k bits of the lower limit are not zeros, then the upper limit will have a carry in the $(k+1)^{th}$ bit relative to the lower limit "Low", and the entire interpretation interval will demonstrate a law as below:

if the low-k bits of the lower limit "Low" are zeros, then the high bits of the lower limit "Low" and the high bits of the upper limit "High" are identical, and the high bits of the entire interpretation interval only has this situation;

if the low-k bits of the lower limit "Low" are not zeros, then for the entire interpretation interval, there are only two situations for the high bits, one is that the high bits are identical to the high bits of the lower limit "Low", and the other is that the high bits are identical to the high bits of the upper limit "High", since there is a carry, therefore the high bits of the upper limit "High" is greater than the high bits of the lower limit "Low" by 1.

It can be seen from the above that, if the decompressor of the ROHC searches values of the low-k bits one by one in the interpretation interval and takes the one that is identical to the value of the received k bits as the decoded value, then the decoding efficiency is obviously low and the information on the received k bits and the saved reference value are not fully utilized. If the decompressor selects to directly replace the low-k bits of the reference value, then the shifting value and the definition of the interpretation interval are not fully considered, the decoded value thus obtained would only be partially correct, and the correctness of decoding can not be guaranteed. It is therefore necessary to provide a decompression method that can fully consider the shifting value and the definition of the interpretation interval, and can utilize the value of the received low-k bits and the reference value to completely and efficiently guarantee decoding with higher correctness.

SUMMARY

The technical problem that the present invention is intended to solve is, through providing a method and device for decoding by using window-based least significant bits (WLSB) in the robust header compression (ROHC), to remedy such deficiencies in existing technologies that decoding efficiency is low and, the correctness of decoding can not be guaranteed, etc, which is caused due to determining a decoded value based on an ergodic method or a method for directly replacing the low-k bits, and to implement decoding efficiently and correctly.

The present invention provides a method for decoding by using window-based least significant bits (WLSB) in the robust header compression (ROHC), which is used for a decompressor to decode a parameter field sent over by a compressor, including the following steps:

(1) the decompressor obtains an upper limit and a lower limit of an interpretation interval to determine the interpretation interval by using an offset in context according to a saved value of the parameter field that is successfully decoded last time and acts as a reference value;

(2) the decompressor determines high bits of a decoded value based on k-bit m received from the compressor as well as the upper limit and/or the lower limit of the interpretation interval, and constructs the decoded value composed of the determined high bits and the received k-bit m which acts as the low bits.

The method may further include:

(3) a complete header is decoded by using the decoding value determined in the step (2), and a check is performed on the header; if the check succeeds, then decoded information is transferred to an upper layer and the context is updated. In the step (3), if the check fails, then calling a repair algorithm to perform repair processing, if the repairing succeeds, then transferring the decoded information to the upper layer and updating the context; if the repairing fails, then dropping the received packet, sending back a negative response at the same time and returning to a next lower-level compression state.

The parameter field is a sequence number (SN) or a timestamp (TS) or an IP identifier (IP-ID) of an RTP/UDP/IP header in a robust header compression (ROHC) protocol.

Furthermore, in the step (2), the method for determining the high bits of the decoded value may be:

obtaining the decoded value by using the received low-k-bit m to replace low-k bits of an end value in the interpretation interval, then determining the decoded value whether or not falls within an interpretation interval, if yes, then taking the decoded value as the final decoded value, otherwise, then using m to replace the low-k bits of another end value in the interpretation interval to act as the final decoded value; wherein, the end value is the upper limit or the lower limit:

when the end value is the upper limit, firstly, selecting that the decoded value has the same high bits as the upper limit of the interpretation interval; then, obtaining the decoded value by using the received k-bit m to replace the low-k bits of the selected upper limit; then comparing the decoded value with the upper limit to see which is greater, and based on the result of the comparison determining whether the decoded value falls within the interpretation interval, if it falls within the interpretation interval, then taking the decoded value as the final decoded value; if the decoded value is greater than the upper limit, then selecting the high bits of the lower limit as the high bits of the decoded value to construct the final decoded value;

when the end value is the lower limit, firstly, selecting that the decoded value has the same high bits as the lower limit of the interpretation interval; then, obtaining the decoded value by using the received k-bit m to replace the low-k bits of the selected lower limit; then comparing the decoded value with the lower limit to see which is greater, and based on the result of the comparison determining whether the decoded value falls within the interpretation interval, if it falls within the interpretation interval, then taking the decoded value as the final decoded value, if the decoded value is smaller than the lower limit, then selecting the high bits of the upper limit as the high bits of the decoded value to construct the final decoded value.

Furthermore, in the step (2), the method for determining the high bits of the decoded value can also be:

comparing the received low-k-bit m with low-k bits of an end value in the interpretation interval to see which is greater, and based on the result of the comparison determining whether to select the high bits of the end value or select the high bits of another end value as the high bits of the decoded value which will be combined together with the received low-k-bit m to construct the decoded value; wherein the end value is the upper limit or the lower limit:

when the end value is the lower limit, firstly, comparing the value of the received k-bit m with the value of low-k bits of the lower limit to see which is greater; if the m is greater than or equal to the value of the low-k bits of the lower limit, then based on the result of the comparison determining to select the high bits of the lower limit as the high bits of the decoded value, and obtaining the decoded value by using the received k-bit m to directly replace the low-k bits of the lower limit of the interpretation interval; if the m is smaller than the value of the low-k bits of the lower limit, then based on the result of the comparison determining to select the high bits of the upper limit as the high bits of the decoded value, and obtaining the decoded value by using the received k-bit m to directly replace the low-k bits of the upper limit of the interpretation interval;

when the end value is the upper limit, firstly, comparing the value of the received k-bit m with the value of low-k bits of the upper limit to see which is greater; if the m is smaller than or equal to the value of the low-k bits of the upper limit, then based on the result of the comparison determining to select the high bits of the upper limit as the high bits of the decoded value, and obtaining the decoded value by using the received k-bit m to directly replace the low-k bits of the upper limit of the interpretation interval; if the m is greater than the value of the low-k bits of the upper limit, then based on the result of the comparison determining to select the high bits of the lower limit as the high bits of the decoded value, and obtaining the decoded value by using the received k-bits m to directly replace the low-k bits of the lower limit of the interpretation interval.

Furthermore, in the step (2), the method for determining the high bits of the decoded value can also be:

selecting an end value as a benchmark value, calculating a difference between low-k bits of this benchmark value and the received k-bit m, then adding the difference to or subtracting the difference from the end value; wherein the end value is the upper limit or the lower limit:

when the end value is the lower limit, firstly, calculating the difference between the received k-bit m and the low-k bits of the lower limit; then, determining the decoded value that is the sum of the lower limit of the interpretation interval and the difference;

when the end value is the upper limit, firstly, calculating the difference obtained by subtracting the value of the received k-bit m from the value of low-k bits of the upper limit; then, determining that the decoded value is a value of subtracting the difference from the upper limit of the interpretation interval.

Furthermore, in the step (1), the upper limit and the lower limit of the interpretation interval are obtained based on the value of the parameter field successfully decoded last time which acts as the reference value "Ref", and by using the offset p in the context are, respectively:

the lower limit of the interpretation interval is Low=Ref−p;
the upper limit of the interpretation interval is High=Ref+$(2^k-1)$−p, wherein "^" means exponentiation.

In the step (3), the method for checking the header may be a cyclic redundancy check CRC method.

The present invention also provides a device based on the decoding method for decoding by using window-based least significant bits in robust header compression, including:

a decompression module, which is used to receive a compressed low-k-bit m, to obtain the complete header by decoding based on an obtained decoded value, and to determine an upper limit and a lower limit of the interpretation interval and the interpretation interval itself based on local parameters, wherein a WLSB decoding algorithm is used during decoding;

a comparison calculation module, which is used for comparison and calculation, i.e. comparing the low-k-bit m with the low-k bits of the upper limit or the low-k bits of the lower limit to see which is greater, comparing the decoded value with the upper limit or the lower limit to see which is greater, and comparing and calculating the difference between the low-k-bit m and the low-k bits of the upper limit or the low-k bits of the lower limit;

a high-bit determination and replacement module, which is used to judge and determine the high bits based on the result of the comparison and calculation, and to construct the decoded value by replacing the low-k-bit m;

wherein, the decompression module sends the received low-k-bit m and the upper and lower limits of the determined interpretation interval to the comparison calculation module for comparison and calculation, and the comparison calculation module sends the result of the comparison to the high-bit determination and replacement module to determine the high bits and to construct the decoded value, and sends the decoded value back to the decompression module to perform decoding to obtain the complete header.

The decoding device may also include:

a check module, which is used to check the header obtained through decoding by the decompression module, if the check succeeds, then the check module sends the information obtained via decoding to the upper layer, otherwise it sends the header to a repair module for repair processing;

a repair module, which is used to call the repair algorithm to repair the decoded value that failed in the check, if the repair is successful, then the repair module sends the information obtained via decoding to the upper layer, otherwise the repair module sends back a response to failure, drops the current packet, and returns to the next lower-level compression state;

wherein, the decompression module sends the header to the check module for checking and, sends it to the repair module for repairing after the checking fails.

The decoding device may use the following method when determining the high bits:

the high-bit determination and replacement module firstly uses the received low-k-bit m to replace low-k bits of an end value in the interpretation interval to obtain a decoded value; then it sends the decoded value to the comparison calculation module to determine whether the decoded value falls within the interpretation interval, if yes, then the high-bit determination and replacement module takes the decoded value as the final decoded value, otherwise, the high-bit determination and replacement module uses the m to replace low-k bits of another end value in the interpretation interval to act as the final decoded value; wherein the end value is the upper limit or the lower limit.

The decoding device may use the following method when determining the high bits:

the comparison calculation module compares the received low-k-bit m with low-k bits of an end value in the interpretation interval to see which is greater; based on the result of the comparison, the high-bit determination and replacement module determines whether to select the high bits of the end value or select the high bits of another end value as the high bits of the decoded value which will be combined together with the received low-k-bit m to construct the decoded value; wherein the end value is the upper limit or the lower limit.

The decoding device may use the following method when determining the high bits:

the comparison calculation module selects an end value as a benchmark value and calculates a difference between low-k bits of this benchmark value and the received k-bit m, then the high-bit determination and replacement module adds the difference to or subtracts the difference from the end value; wherein the end value is the upper limit or the lower limit; adding when it is the lower limit, or subtracting when it is the upper limit.

A decoding algorithm is one of the core algorithms in the entire compression and decompression. In existing protocols, no description is actually made on the entire decoding algorithm, what is described is that a value of low-k bits found in an interpretation interval that is identical to a value of the received k-bit m will be used as a decoded value, nor is any description made that a decoding process is relative to an interpretation interval. In some of the existing decoding methods, a reference value "Ref" is replaced directly, but these methods later are proved to be at least incomplete or wrong. An innovative decoding method is provided in the application of the method and device for decoding as described in the present invention, which defines a decoded value on two endpoints (an upper limit and a lower limit) of an interpretation interval to perform comparison or replacement accordingly, and therefore can realize decoding simply by determining the high bits of the decoded value. This method is indeed very easy and simple in specific embodiments, particularly during the process of code realization, because it avoids an ergodic method in existing protocols, and it is capable of realizing decoding efficiently and correctly.

DETAILED DESCRIPTION

Descriptions of the present invention will be made here in more details with reference to the drawings.

Figure 1:
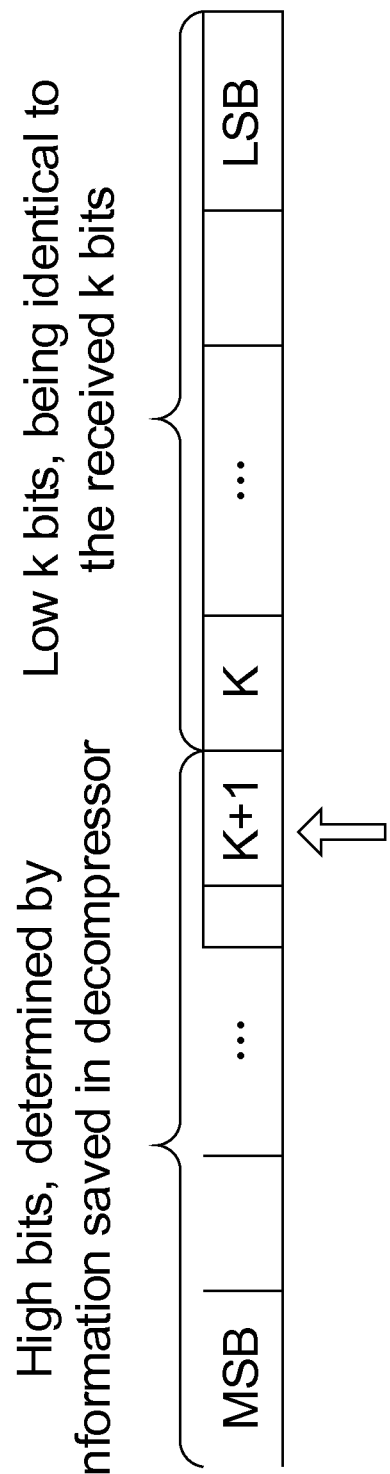
FIG. 1 is a schematic illustration of a possible carry in the $(k+1)^{th}$ bit that may arise during a decoding process.
Figure 2:
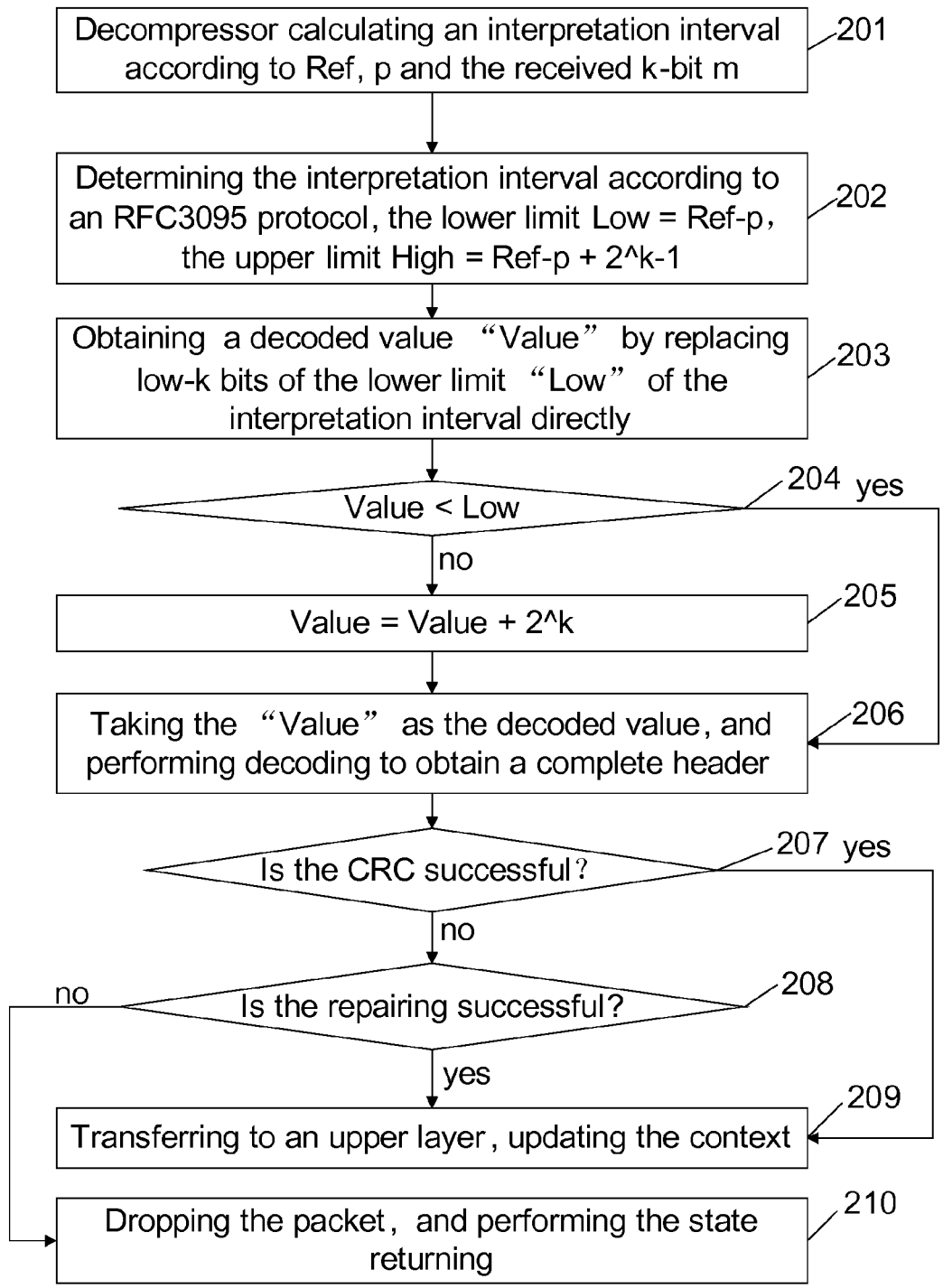
FIG. 2 is a schematic illustration of a decoding process of firstly using low bits to replace a lower limit "Low" of an interpretation interval and then comparing a decoded value with the "Low" to see which is greater so as to determine whether or not to perform shifting.
Figure 3:
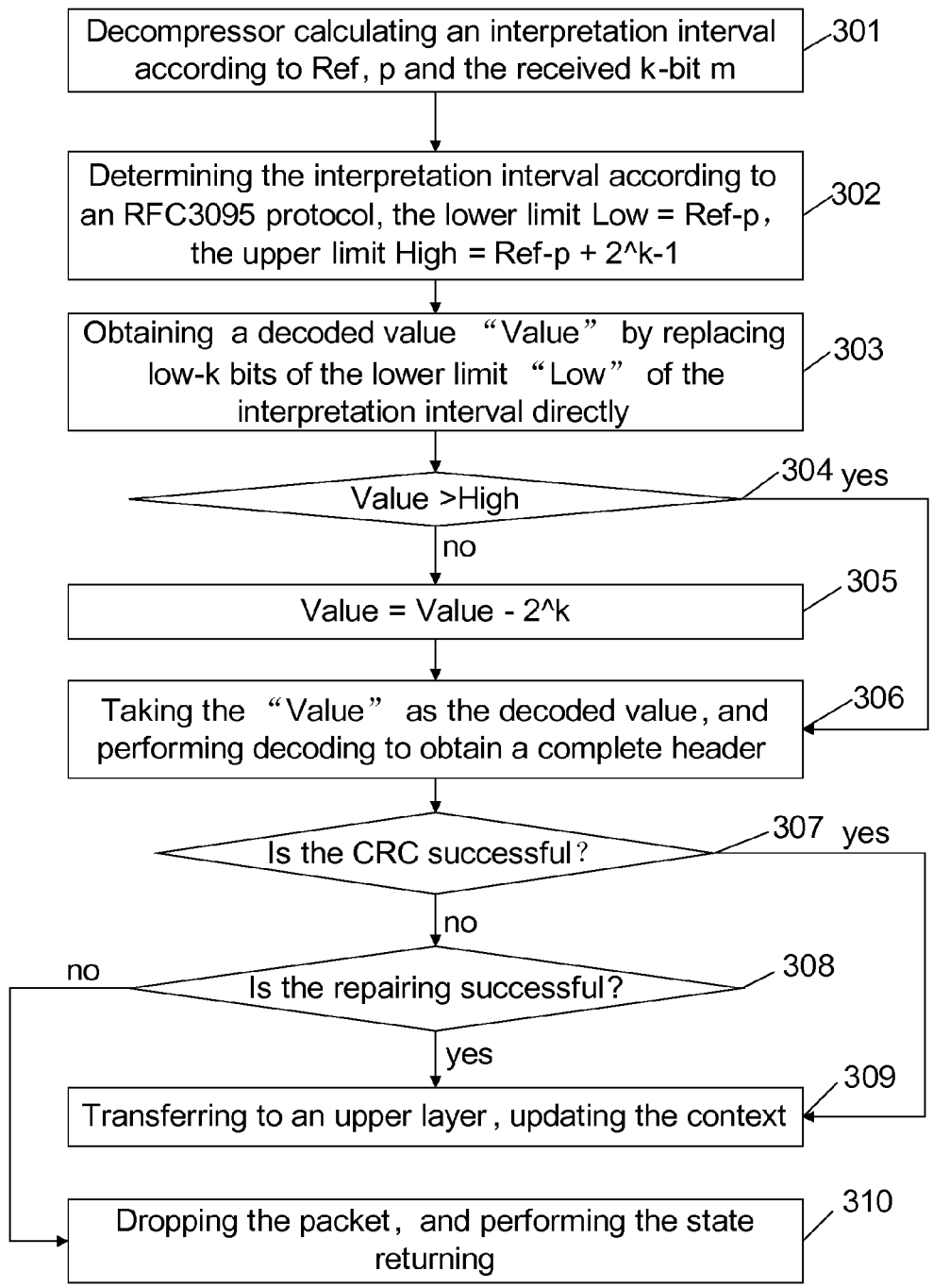
FIG. 3, similar to FIG. 2, is a schematic illustration of a decoding process of firstly using low bits to replace an upper limit "High" of an interpretation interval, and then comparing a decoded value with the "High" to see which is greater so as to determine whether or not to perform shifting.
Figure 4:
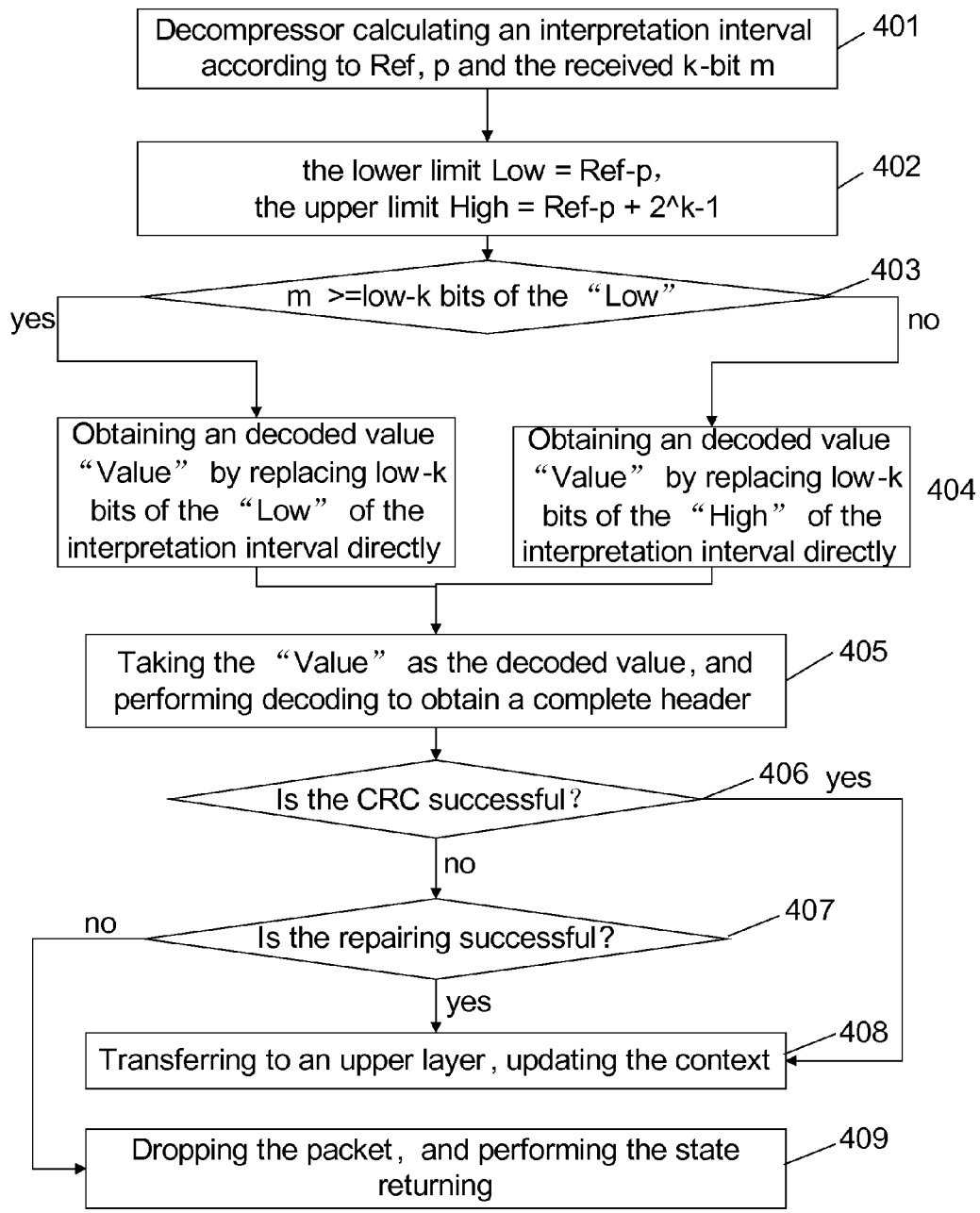
FIG. 4 is a schematic illustration of a process of firstly comparing the received k-bit m with the low-k-bit m_Low of a lower limit "Low" in an interpretation interval to see which is greater, and then determining whether the high bits of the upper limit or the high bits of the lower limit of the interpretation interval are selected as high bits of a decode value to decode.
Figure 5:
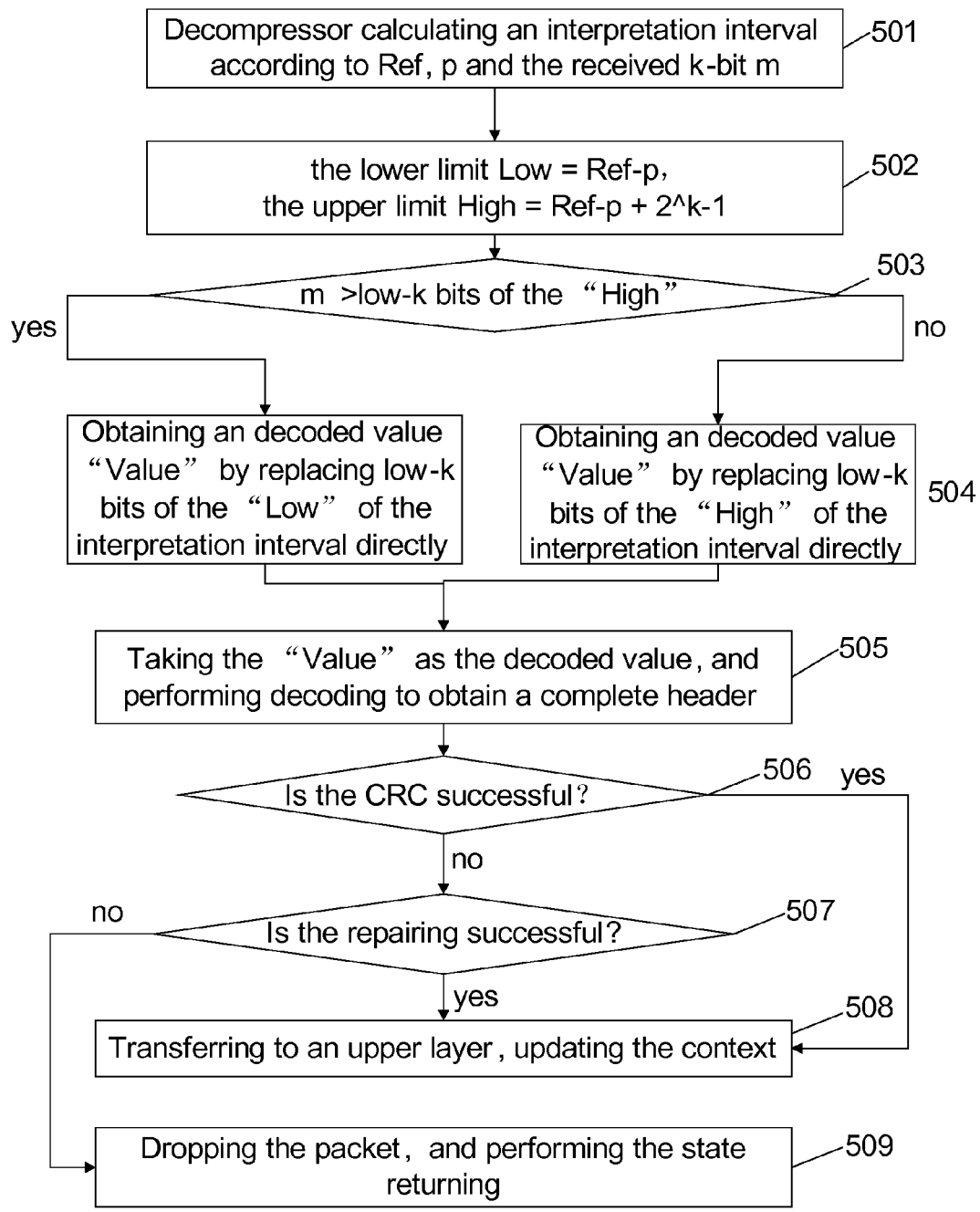
FIG. 5, similar to FIG. 4, is a schematic illustration of a process of firstly comparing the received k-bit m with the low-k-bit m_High of an upper limit "High" in an interpretation interval to see which is greater, and then determining whether the high bits of the upper limit or the high bits of the lower limit of the interpretation interval are selected as high bits of a decode value to decode.
Figure 6:
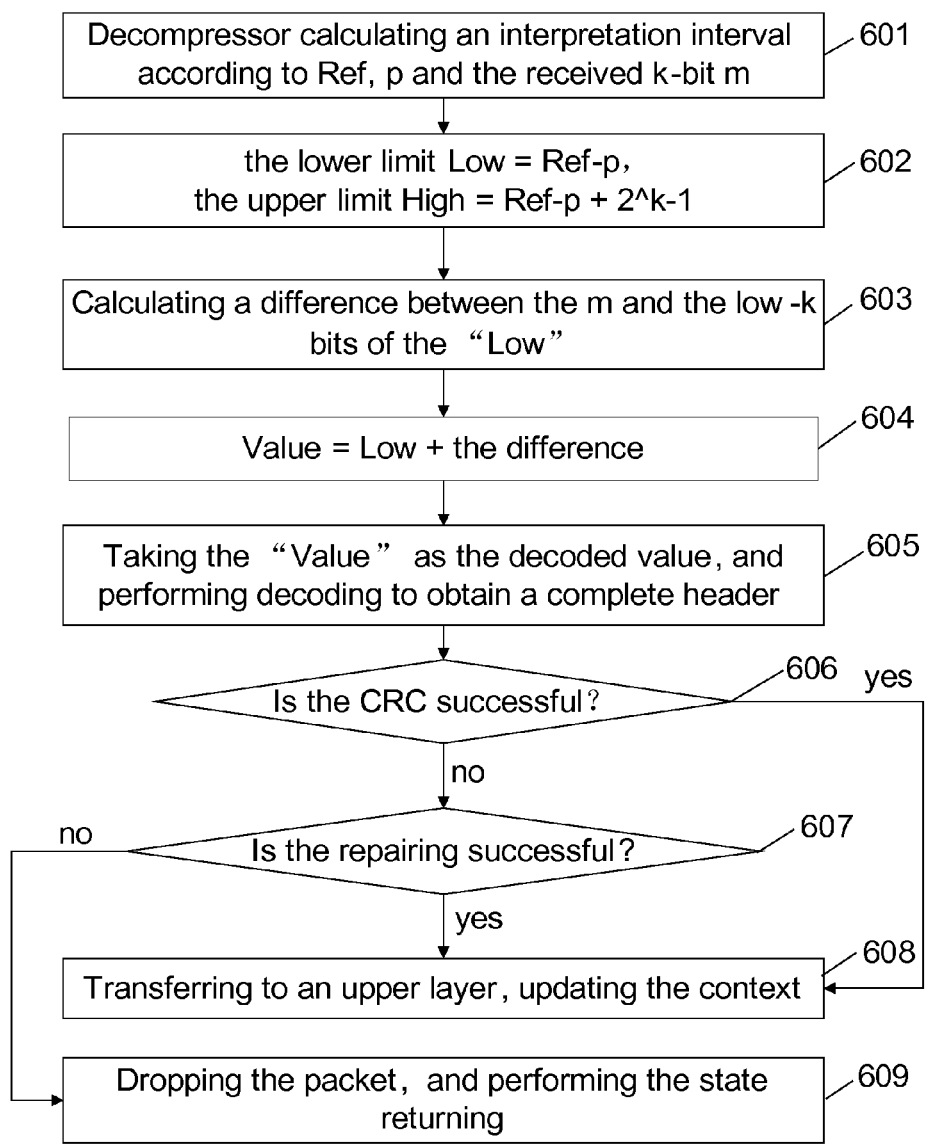
FIG. 6 is a schematic illustration of a process of firstly selecting a lower limit "Low" as a benchmark value, and then taking the sum of this benchmark value and a difference between the received k-bit m and the low-k-bit m_Low of a lower limit "Low" (k-bit operation) as a decoded value, and this method can automatically adjust the high bits to be equal to the high bits of the lower limit "Low" or equal to the high bits of the upper limit "High"
Figure 7:
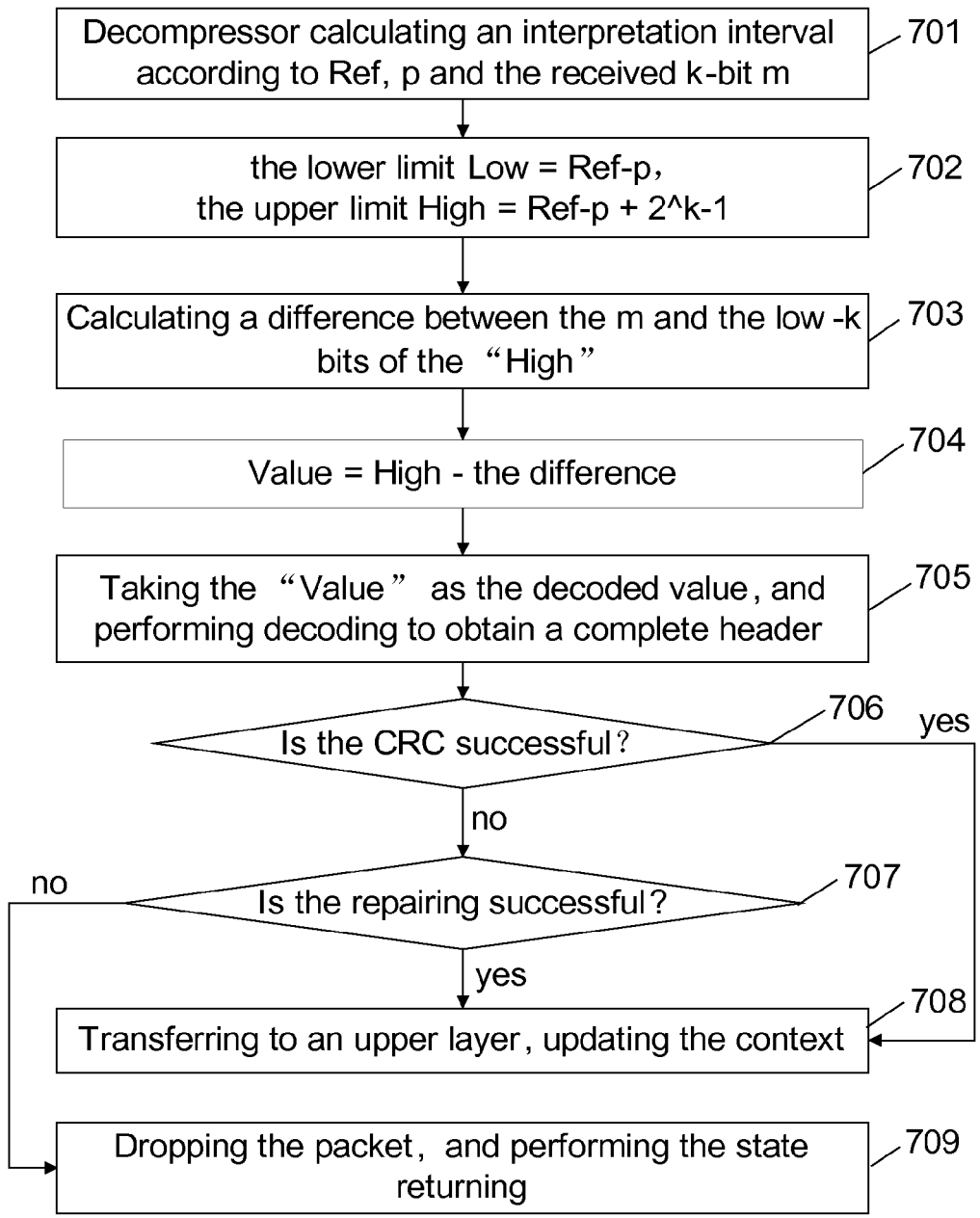
FIG. 7, similar to FIG. 6, is a schematic illustration of a process of firstly selecting an upper limit "High" as a benchmark value, and then subtracting a difference between the low-k-bit m_High of the upper limit "High" and of the received k-bit m (k-bit operation) from the benchmark value as a decoded value.

The key of the present invention lies in how to determine high bits of a decoded value, while for the high bits of the decoded value, there are two possible situations, i.e. being equal to high bits of an upper limit "High" or being equal to high bits of a lower limit "Low". There is a carry in the $(k+1)^{th}$ bit of the upper limit "High" being relative to the lower limit "Low", and FIG. 1 illustrates a processing of a possible carry in the $(k+1)^{th}$ bit in an interpretation interval, and FIG. 2, FIG. 4 and FIG. 6 illustrate, respectively, different decoding processing in such a carry case in which a lower limit "Low" is used as a benchmark value, while FIG. 3, FIG. 5 and FIG. 7 illustrate similar decoding methods by using an upper limit "High" as a benchmark value.

It is practical to obtain a decoded value simply through one-step operation and ensure the completeness and correctness of decoding by utilizing some mathematic relations to define an interpretation interval. In view of this, the present invention provides an efficient decoding method by fully utilizing the numerical relation between an upper limit and a lower limit of the interpretation interval and k bits which are received.

In the interpretation interval, the lower limit Low=Ref−p, the upper limit High=Ref+($2^k$−1)−p, wherein the "^" means exponentiation. Defining a field such as an SN, whose most significant bit is defined as MSB and the least significant bit is defined as LSB. For the SN with 16 bits, MSB=16, and LSB=1. Likewise, for an IP-ID with 16 bits, MSB=16, and LSB=1; for a TS with 32 bits, MSB=32, and LSB=1.

The present invention takes decoding the SN as an example, there being similar methods for decoding an IP-ID or a TS; the present invention defines the range from the LSB to the $k^{th}$ bit as low-k bits, defines the range from the $(k+1)^{th}$ bit to the MSB as high bits, defines a value of the low-k bits of a lower limit "Low" in the interpretation interval as m_Low, and defines a value of the low-k bits of an upper limit "High" in the interpretation interval as m_High.

The interpretation interval is a range of values, and the decoded value must fall within the interpretation interval. It can be seen from the definition of the interpretation interval that High=Low+($2^k$−1), i.e. the upper limit "High" is equal to the sum of the lower limit "Low" and "1 . . . 1" (k bits of 1), therefore if the low-k bits of the lower limit are not zeros, then the upper limit will have a carry in the $(k+1)^{th}$ bit relative to the lower limit "Low", and the entire interpretation interval will demonstrate a law as below:

if the low-k bits of the lower limit "Low" are zeros, then the high bits of the lower limit "Low" and the high bits of the upper limit "High" are identical, and the high bits of the entire interpretation interval only has this situation;

if the low-k bits of the lower limit "Low" are not zeros, then there are only two situations for the high bits of the entire interpretation interval, one is that the high bits of the entire interpretation interval are identical to the high bits of the lower limit "Low", and the other is that the high bits of the entire interpretation interval are identical to the high bits of the upper limit "High", since there is a carry, the high bits of the upper limit "High" is greater than the high bits of the lower limit "Low" by 1.

There are two situations for the lower limit of the interpretation interval, when the high bits of the decoded value are identical to the high bits of the lower limit "Low", then the range of values of the low-k bits of the decoded value is [m_Low, $2^k$−1], wherein the m_Low is the value of the low-k bits of the lower limit "Low"; if the high bits of the decoded value are identical to the high bits of the upper limit "High", then the range of values of the low-k bits of the decoded value is [0, m_High], wherein the m_High is the value of the low-k bits of the upper limit "High".

Because High=Low+($2^k$−1), if the m_Low is not zero, then m_High=m_Low−1. Likewise, it is also true that if the value of the low-k bits of the decoded value falls within the interval [m_Low, $2^k$−1], then the high bits of the decoded value are identical to the high bits of the lower limit "Low"; if the value of the low-k bits of the decoded value falls within the interval [0, m_High], then the high bits of the decoded value are identical to the high bits of the upper limit "High".

It can be obtained from the above that a decompressor is mainly used to determine a value of the high bits by decoding based on the received k-bit m, if the low-k bits of the lower limit "Low" in the interpretation interval are zeros, then there is only one situation for selecting the high bits. If the low-k bits are not zeros, then the decompressor must determine whether the high bits of the decoded value are identical to the high bits of the lower limit "Low" or are identical to the high bits of the upper limit "High", otherwise an error would occur in decoding.

The methods for determining the high bits in the present invention include:

(1) using the received low-k-bit m to replace low-k bits of an end value in the interpretation interval to obtain a decoded value, then determining whether or not the decoded value falls within the interpretation interval, if yes, then the decoded value is used as the final decoded value, otherwise, using the m to replace low-k bits of another end value in the interpretation interval to act as the final decoded value;

for example, firstly, selecting the high bits of the decoded value to be identical to the high bits of the lower limit "Low", then after a simple replacement of the low bits, comparing the decoded value with the lower limit "Low" to see which is greater, if the decoded value is smaller than the lower limit and does not fall within the interpretation interval, then selecting the high bits of the upper limit "High" as the high bits of the decoded value;

(2) comparing the received low-k-bit m with low-k bits of an end value in the interpretation interval to see which is greater, and according to the result of the comparison determining whether to select the high bits of the end value or select the high bits of another end value as the high bits of the decoded value, which will be combined together with the received low-k-bit m to construct the decoded value;

for example, before selecting the high bits, comparing the value of the received k bits with the value of the low-k bits of the lower limit "Low" to see which is greater firstly, then if the value of the low-k bits falls within the range [m_Low, 2^k−1], then selecting the high bits of the decoded value to be identical to the high bits of the lower limit "Low", otherwise selecting the high bits of the decoded value to be identical to the high bits of the upper limit "High";

(3) selecting an end value as a benchmark value, calculating a difference between the low-k bits of this benchmark value and the received k-bit m, then adding the difference to or subtract the difference from the end value (summing when the benchmark value is the lower limit "Low", and subtracting when it is the upper limit "High");

it can be categorized into two situations: firstly, if the selected benchmark value is the lower limit "Low", then the difference is the result of subtracting the low-k-bit m_Low of the lower limit "Low" from the k-bit m, and then the decoded value is the sum of the lower limit "Low" and the difference. If the selected benchmark value is the upper limit "High", then the difference is a result of subtracting the received k-bit m from the low-k-bit m_High of the upper limit, and then the decoded value is a value of subtracting the difference from the upper limit "High". The order of subtraction herein when calculating the difference is different, and it is the difference that the end value finally adds or subtracts;

for example, determining the benchmark value to be the lower limit "Low", then adding the difference between the received m and the low-k-bit m_Low of the lower limit "Low" (doing subtraction for k bits); if the m is greater than the m_Low, then directly taking the high bits of the lower limit "Low" as the high bits of the decode value; if the m is smaller than the m_Low, then because a mathematical calculation is done for k bits, and a 2^k would be added during the actual calculation, while the high bits of the upper limit "High" has a carry in the $(k+1)^{th}$ bit relative to the lower limit "Low", so that the high bits are adjusted to be just equal to the high bits of the upper limit, so as to provide a correct decoded value.

The examples above for determining the high bits only select the lower limit "Low" as a reference value, actually, the upper limit "High" can also be selected as a reference value to determine the high bits in other similar methods.

The high bits refer to the rest of bits except low-k bits, and there are two possible situations for the selection of the high bits—being identical to the high bits of the lower limit "Low" or being identical to the high bits of the upper limit, therefore the key of decoding is just comparison (comparing with the received k-bit m) and replacement (based on the result of the comparison determining whether the low bits of the "Low" or the low bits of the "High" will be replaced, such replacement is simply regarding how to determine the high bits, because if it selects to replace low-k bits of the "Low", then it means that the high bits of the decoded value are selected to be identical to the high bits of the lower limit "Low", and the same also holds true when replacing the upper limit), or it is also fine to reverse the procedure to replace firstly and then compare.

In FIG. 1, based on the definition of the interpretation interval, the upper limit of the interpretation interval is High=Low+(2^k−1), therefore the low-k bits of the decoded value are determined by the value of the received k bits. There are only two situations for the value of the high bits of the decoded value (from the $(k+1)^{th}$ bit to the most significant bit (MSB)): one situation is that the high bits of the decoded value are identical to the high bits of the lower limit "Low" in the interpretation interval, and the other situation is that the high bits of the decoded value are identical to the high bits of the upper limit "High" in the interpretation interval. When the high bits of the decoded value are identical to the high bits of the lower limit "Low" in the interpretation interval, the range of values of the low-k bits of the decoded value is [m_Low, 2^k−1]; and when the high bits of the decoded value are identical to the high bits of the upper limit "High", the range of values of the low-k bits of the decoded value is [0, m_High], i.e. [0, m_Low−1] (when the m_Low is not zero). Therefore, the high bits of the decoded value can be determined by comparing the received k-bit m with the low-k-bit m_Low of the lower limit "Low" in the interpretation interval to see which is greater. Likewise, the high bits of the decoded value can also be determined by comparing the received k-bit m with the low-k-bit m_High of the upper limit "High" in the interpretation interval to see which is greater. If the low-k bits of the lower limit "Low" in the interpretation interval are zeros, then the high bits of the entire interpretation interval are identical, and the high bits of the decoded value decoded are identical to the high bits of the lower limit "Low" or the high bits of the upper limit "High".

High=Low+(2^k−1), if the low-k bits of the lower limit "Low" are not zeros, then the value of the upper limit "High" will have a carry in the $(k+1)^{th}$ bit relative to the lower limit "Low", i.e. increased by 1 in the $(k+1)^{th}$ bit, the range of values of the low-k bits that are identical to the bits from the $(k+1)^{th}$ bit to the most significant bit (MSB) of the lower limit "Low" in the interpretation interval is [m_Low, 2^k−1], and the range of values of the low-k bits that are identical to the high bits of the upper limit "High" is [0, m_High], i.e. [0, m_Low−1].

Embodiment 1

FIG. 2 is a decoding flowchart of determining whether or not to perform shifting by firstly replacing low bits of a lower limit "Low" in an interpretation interval, and then comparing a decoded value with the lower limit "Low" to see which is greater: step 201, based on the rules of the protocol RFC3095, a decompressor uses a saved SN being successfully decoded last time as a reference value "Ref", and gets ready to initialize and calculate an interpretation interval by using an offset p in context and a received k-bit m which is compressed;

step 202, based on the protocol RFC3095, the decompressor determines the interpretation interval, and calculates the interpretation interval's lower limit Low=Ref−p, and the upper limit High=Ref+(2^k−1)−p; wherein the "^" means exponentiation;

step 203, the received k bits are directly used to replace the low-k bits of the lower limit "Low" in the interpretation interval;

wherein, as shown in FIG. 1, for the entire interpretation interval, when the low-k bits of the lower limit "Low" in the interpretation interval are not zeros, there are only two situations for the high bits (from the $(k+1)^{th}$ bit to the most significant bit (MSB)): one is that the high bits are identical to the high bits of the lower limit "Low" in the interpretation interval; the other is that the high bits are identical to the high bits of the upper limit "High" in the interpretation interval. The simple replacement of the low-k bits of the "Low" only assumes by default that the high bits of the decoded value are identical to the high bits of the lower limit "Low" in the interpretation interval; it is obvious that such decoding is not complete enough; it is therefore necessary to further determine whether the selection of the high bits of the decoded value is proper;

step 204, determining whether the decoded value "Value" that is obtained by decoding in the step 203 is smaller than the lower limit "Low" in the interpretation interval, if yes, then meaning that the decoded value is not within the interpretation interval (i.e. an error occurs in decoding), thus step 205 being executed, otherwise jumping to step 206;

step 205, the decoded value "Value" is obtained by decoding and Value<Low, which means that the decoded value is not within the interpretation interval and needs to be adjusted, therefore Value=Value+2^k is executed, i.e. the decoded value forward is adjusted by 2^k units, wherein the "^" means exponentiation;

FIG. 1 has already illustrated that the high bits of all values in the interpretation interval (from the $(k+1)^{th}$ bit to the most significant bit (MSB)) are only identical to the high bits of either the lower limit "Low" or the upper limit "High", and moreover only the two situations exist, wherein the high bits of the "High" only have one possible carry in the $(k+1)^{th}$ bit relative to the "Low" (except the situation that the low-k bits of the "Low" are zeros, but in this situation, Value<Low would not exist); therefore, if it is incorrect to use the high bits of the lower limit "Low" as the high bits of the decoded value, then it is necessary to add a carry in the $(k+1)^{th}$ bit of this value so that its high bits are identical to the high bits of the upper limit "High", i.e. adding a 2^k to the previous decoded value "Value", i.e. Value=Value+2^k;

step 206, using the "Value" as the decoded value to perform decoding to obtain a complete header;

step 207, performing a CRC check on the header, if the CRC check succeeds, then jumping to step 209; if the CRC check fails, then jumping to step 208 to perform repair processing;

step 208, if the decoding fails, then calling a repair algorithm to perform repair processing, if the repairing is successful, then jumping to step 209, otherwise jumping to step 210;

step 209, the decoded value is correct, and the decompressor sends information to an upper layer and updates the context; and step 210, the decoding fails, so does the repairing, then the decompressor drops the received packet, sends back a negative response at the same time, and returns to a next lower-level compression state.

Embodiment 2

FIG. 3 is a decoding flowchart of determining whether or not to perform shifting by firstly replacing low bits of an upper limit "High" in an interpretation interval, and then comparing a decoded value with the upper limit "High" to see which is greater, in which the process is similar to that in FIG. 2:

step 301, based on the rules of the protocol RFC3095, a decompressor uses a saved SN being successfully decoded last time as a reference value "Ref", and gets ready to initialize an interpretation interval by using an offset p in context and a received k-bit m which is compressed; step 302, based on the protocol RFC3095, the decompressor determines the interpretation interval, and calculates the interpretation interval's lower limit Low=Ref−p, and the upper limit High=Ref+(2^k−1)−p, wherein the "^" means exponentiation;

step 303, the received k bits are directly used to replace the low-k bits of the upper limit "High" in the interpretation interval;

wherein, as shown in FIG. 1, for the entire interpretation interval, when the low-k bits of the lower limit "Low" in the interpretation interval are not zeros, there are only two situations for the high bits (from the $(k+1)^{th}$ bit to the most significant bit (MSB)): one is that the high bits are identical to the high bits of the "Low", and the other is that the high bits are identical to the high bits of the "High". The simple replacement of the low-k bits of the "High" only assumes by default that the high bits of the decoded value are identical to the high bits of the upper limit "High" in the interpretation interval, however, such decoding is not complete enough; it is therefore necessary to determine whether the selection of the high bits of the decoded value is proper; step 304, determining whether the decoded value "Value" that is obtained by decoding in the step 303 is greater than the upper limit "High" in the interpretation interval, if yes, then executing step 305, otherwise jumping to step 306;

step 305, the decoded value "Value" is obtained by decoding and Value>High, which means that the decoded value is not within the interpretation interval, and a decoding error exists and a new adjustment is needed, therefore Value=Value−2^k is executed, i.e. the decoded value backward is adjusted by 2^k units;

FIG. 1 has already illustrated that the high bits of all values in the interpretation interval (from the $(k+1)^{th}$ bit to the most significant bit (MSB)) are only identical to the high bits of either the lower limit "Low" or the upper limit "High", and moreover only the two situations exist, wherein the high bits of upper limit "High" only have one possible carry in the $(k+1)^{th}$ bit relative to lower limit "Low" (except the situation that the low-k bits of the "Low" are zeros, but in this situation, Value>High would not exist); therefore, if the decoded value obtained is incorrect when using the high bits of the upper limit "High" as the high bits of the decoded value to decode, then it is necessary to subtract a carry from the $(k+1)^{th}$ bit of this value so that the high bits of the decoded value "Value" are identical to the high bits of the "Low", i.e. subtracting a 2^k from the previous decoded value "Value", that is to say Value=Value−2^k;

step 306, using the "Value" as the decoded value to perform decoding to obtain a complete header;

step 307, performing a CRC check on the header, if the CRC check succeeds, then jumping to step 309; if the CRC check fails, then jumping to step 308 to perform repair processing;

step 308, if the decoding fails, then calling a repair algorithm to perform repair processing, if the repairing succeeds, then jumping to step 309, otherwise jumping to step 310;

step 309, the decoded value is correct, and the decompressor sends information to an upper layer and updates the context; and step 310, the decoding fails, so does the repairing, then the decompressor drops the received packet, sends back a negative response at the same time, and returns to a next lower-level compression state.

Embodiment 3

FIG. 4 shows a decoding process of firstly comparing a received k-bit m with low-k bits of a lower limit "Low" in an interpretation interval to see which is greater, and then selecting high bits:

step 401, based on the rules of the protocol RFC3095, a decompressor uses a saved SN being successfully decoded last time as a reference value "Ref", and gets ready to initialize an interpretation interval by using an offset p in context and a received k-bit m which is compressed;

step 402, based on the protocol RFC3095, the decompressor determines the interpretation interval, and calculates the interpretation interval's lower limit Low=Ref−p, and the upper limit High=Ref+(2^k−1)−p, wherein the "^" means exponentiation;

step 403, comparing the m with the value of the low-k bits of the lower limit "Low" in the interpretation interval to see which is greater;

wherein, as shown in FIG. 1, for the entire interpretation interval, there are at most two situations for the selection of the high bits: one is that the high bits are identical to the high bits of the lower limit "Low" in the interpretation interval, and the other is that the high bits are identical to the high bits of the upper limit "High" in the interpretation interval; when the high bits are identical to the high bits of the "Low", the interval of values of the low-k bits is [m_Low, 2^k−1], wherein the m_Low is the value of the low-k bits of the lower limit "Low", i.e. when the received k-bit m is greater than or equal to the m_Low, the high bits of the decoded value are identical to the high bits of the "Low", otherwise the high bits of the decoded value are identical to the high bits of the "High". While simply replacing the low-k-bit m_Low of the "Low" by the m only assumes by default that the high bits of the decoded value are identical to the high bits of the lower limit in the interpretation interval, such decoding is not complete enough; it is therefore necessary to determine whether the selection of the high bits of the decoded value is proper;

step 404, if the value of the m is greater than or equal to the value of the low-k-bit m_Low of the lower limit, then using the k-bit m to directly replace the low-k bits of the lower limit "Low" in the interpretation interval, otherwise using the k-bit m to directly replace the low-k bits of the upper limit "High" in the interpretation interval to obtain the decoded value. If the low-k bits of the lower limit "Low" in the interpretation interval are zeros, then the decoded value simply can be obtained via direct replacement, because the value of the received k-bit m is definitely greater than or equal to zero. The method for comparing first and then replacing therefore is applicable to all possible decoding situations; wherein, based on the determining result, the received k-bit m to replace the low-k bits of the "Low" or the low-k bits of the "High"; if the low-k bits of the "Low" are replaced, then the high bits of the decoded value are selected to be identical to the high bits of the "Low", the same also holds true when replacing the low-k bits of the "High", i.e. the high bits of the decoded value are selected to be identical to the high bits of the "High", so that a complete decoded value can be obtained.

step 405, the decoded value is defined as "Value" to perform decoding to obtain a complete header;

step 406, performing a CRC check on the header, if the CRC check succeeds, then jumping to step 408; if the CRC check fails, then jumping to step 407 to perform repair processing;

step 407, if the decoding fails, then calling a repair algorithm, if the repairing succeeds, then jumping to step 408, otherwise jumping to step 409;

step 408, the decoded value is correct, and the decompressor sends information to an upper layer and updates the context; and step 409, the decoding fails, so does the repairing, then the decompressor drops the received packet, sends back a negative response at the same time, and returns to a next lower-level compression state.

Embodiment 4

FIG. 5 shows a decoding process of firstly comparing a received k-bit m with low-k bits of an upper limit "High" in an interpretation interval, and then selecting high bits, in which the process is similar to that shown in FIG. 4:

step 501, based on the rules of the protocol RFC3095, a decompressor uses a saved SN being successfully decoded last time as a reference value "Ref", and gets ready to initialize of an interpretation interval by using an offset p in context and a received k-bit m which is compressed;

step 502, based on the protocol RFC3095, the decompressor determines the interpretation interval, and calculates the interpretation interval's lower limit Low=Ref−p, and the upper limit High=Ref+(2^k−1)−p, wherein the "^" means exponentiation;

step 503, comparing the m with the value of the low-k bits of the upper limit "High" in the interpretation interval to see which is greater;

it can be seen from FIG. 1 that, for the entire interpretation interval, there are at most two situations for the selection of the high bits: one is that the high bits are identical to the high bits of the lower limit "Low" in the interpretation interval, and the other is that the high bits are identical to the high bits of the upper limit "High" in the interpretation interval. When the high bits are identical to the high bits of the lower limit "Low", the interval of values of the low-k bits is [m_Low, 2^k−1], wherein the m_Low is the value of the low-k bits of the lower limit "Low", i.e. when received k-bit m is greater than or equal to the m_Low, the high bits of the decoded value are identical to the high bits of the lower limit "Low", otherwise the high bits of the decoded value are identical to the high bits of the upper limit "High". While simply replacing the low-k bits of the lower limit "Low" only assumes by default that the high bits of the decoded value are identical to the high bits of the lower limit "Low" in the interpretation interval, and such decoding is not complete enough. Similarly, if the simple replacement of the low-k bits of the upper limit "High" also assumes by default that the high bits of the decoded value are identical to the high bits of the upper limit, then such decoding is not complete enough either. It is therefore necessary to determine whether the selection of the high bits of the decoded value is proper;

step 504, if the value of the m is smaller than or equal to the value of the low-k-bit m_High of the upper limit "High", then the k-bit m are used to directly replace the low-k bits of the upper limit "High" in the interpretation interval as a decoded value, otherwise using the k-bit m to directly replace the low-k bits of the lower limit "Low" in the interpretation interval as a decoded value. If the low-k bits of the lower limit "Low" in the interpretation interval are zeros, then the decoded value simply can be obtained via direct replacement, because the value of the received k-bit m is definitely greater than or equal to zero. The method for comparing first and then replacing therefore is applicable to all possible decoding situations;

step 505, the decoded value is defined as "Value" to perform decoding to obtain a complete header;

step 506, performing a CRC check on the header, if the CRC check succeeds, then jumping to step 508; if the CRC check fails, then jumping to step 507 to perform repair processing;

step 507, if the decoding fails, then calling a repair algorithm to perform repair processing, if the repairing succeeds, then jumping to step 508, otherwise jumping to step 509;

step 508, the decoded value is correct, and the decompressor sends to an upper layer and updates the context;

step 509, the decoding fails, so does the repairing, then the decompressor drops the received packet, sends back a negative response at the same time, and returns to a next lower-level compression state.

Embodiment 5

FIG. 6 shows a process of firstly selecting a lower limit "Low" in an interpretation interval as a benchmark value, and then taking the sum of the benchmark value and a difference between the received k-bit m and the low-k-bit m_Low of the lower limit "Low" (k-bit operation) as a decoded value:

step 601, based on the rules of the protocol RFC3095, a decompressor uses a saved SN being successfully decoded last time as a reference value "Ref", and gets ready to initialize an interpretation interval by using an offset p in context and a received k-bit m which is compressed;

step 602, based on the protocol RFC3095, the decompressor determines the interpretation interval, and calculates the interpretation interval's lower limit Low=Ref−p, and the upper limit High=Ref+(2^k−1)−p, wherein the "^" means exponentiation;

step 603, calculating a difference between the value of the received k-bit m and the low-k bits of the lower limit "Low", this calculation is only limited to calculate the value of k bits; if the m is smaller than the value of the low-k bits of the lower limit "Low", then a borrow will be obtained, which is equivalent to increasing the m by an amount of 2^k;

step 604, a decoded value "Value" equals to the sum of the lower limit "Low" in the interpretation interval and that difference;

if the high bits of the decoded value are identical to the high bits of the lower limit "Low" in the interpretation interval, i.e. the value of the m falls within the interval [m_Low, 2^k−1], then the difference thus obtained between the m and the low-k bits of the "Low" will be positive, without any borrow information generated, which only simply replaces the low-k bits of the "Low" to act as the decoding value. Otherwise, if the high bits of the decoded value are identical to the high bits of the upper limit "High" in the interpretation interval, i.e. the value of the m falls within the interval [0, m_High], and m_High=m_Low−1, therefore the m is smaller than the value of the low-k bits of the "Low", and the m must borrow from the (k+1)$^{th}$ bit, i.e. being equivalent to obtain a decoded value "Value" by adding 2^k, thus this value simply adjusts the high bits of the decoded value to be identical to the high bits of the upper limit "High", so that a correct decoded value is obtained.

step 605, using the "Value" as the decoded value to perform decoding to obtain a complete header;

step 606, performing a CRC check on the header, if the CRC check succeeds, then jumping to step 608; if the CRC check fails, then jumping to step 607 to perform repair processing;

step 607, if the decoding fails, then calling a repair algorithm, if the repairing succeeds, then jumping to step 608, otherwise jumping to step 609;

step 608, the decoded value is correct, and the decompressor sends information to an upper layer and updates the context; and step 609, the decoding fails, so does the repair, and the decompressor drops the received packet, sends back a negative response at the same time, and returns to a next lower-level compression state.

Embodiment 6

FIG. 7 illustrates a process of firstly selecting an upper limit "High" in the interpretation interval as a benchmark value, and then taking the result of subtracting a difference between the low-k-bit m_High of the upper limit "High" and the received k-bit m (k-bit operation) from the benchmark value as a decoded value, which is similar to FIG. 6:

step 701, based on the rules of the protocol RFC3095, a decompressor uses a saved SN being successfully decoded last time as a reference value "Ref", and gets ready to initialize an interpretation interval by using an offset p in context and a received k-bit m which is compressed;

step 702, based on the protocol RFC3095, the decompressor determines the interpretation interval, and calculates the interpretation interval's lower limit Low=Ref−p, and the upper limit High=Ref+(2^k−1)−p, wherein the "^" means exponentiation;

step 703, calculating a difference between the value of the low-k bits of the upper limit "High" in the interpretation interval and the value of the received k-bit m, this calculation is only limited to calculate the value of k bits, if the value of the low-k bits of "High" is smaller than the m, then a borrow will be obtained;

step 704, a decoded value "Value" is obtained by the upper limit "High" in the interpretation interval subtracting that difference;

if the high bits of the decoded value are identical to the high bits of the upper limit "High" in the interpretation interval, i.e. the value of the m falls within the interval [0, m_High], then the difference thus obtained between the m and the low-k bits of the "High" will be positive, without any borrow information generated, which only simply replaces the low k bit of the "High" to act as the decoded value. Otherwise, if the high bits of the decoded value are identical to the high bits of the lower limit "Low" in the interpretation interval, i.e. the value of the m falls within the interval [m_Low, 2^k−1], and m_High=m_Low−1, the low-k bits of the "High" are therefore smaller than m, and must borrow from the (k+1)$^{th}$ bit, i.e. being equivalent to obtain a decoded value "Value" by subtracting 2^k from the "High", thus this value simply adjusts the high bits of the decoded value to be identical to the high bits of the lower limit "Low", so that a correct decoded value is obtained.

step 705, using the "Value" as the decoded value to perform decoding to obtain a complete header;

step 706, performing a CRC check on the header, if the CRC check succeeds, then jumping to step 708; if the CRC check fails, then jumping to step 707 to perform repair processing;

step 707, if the decoding fails, then calling a repair algorithm, if the repairing succeeds, then jumping to step 708, otherwise jumping to step 709;

step 708, the decoded value is correct, and the decompressor sends information to an upper layer and updates the context; and step 709, the decoding fails, so does the repairing, and the decompressor drops the received packet, sends back a negative response at the same time, and returns to a next lower-level compression state.

Figure 8:
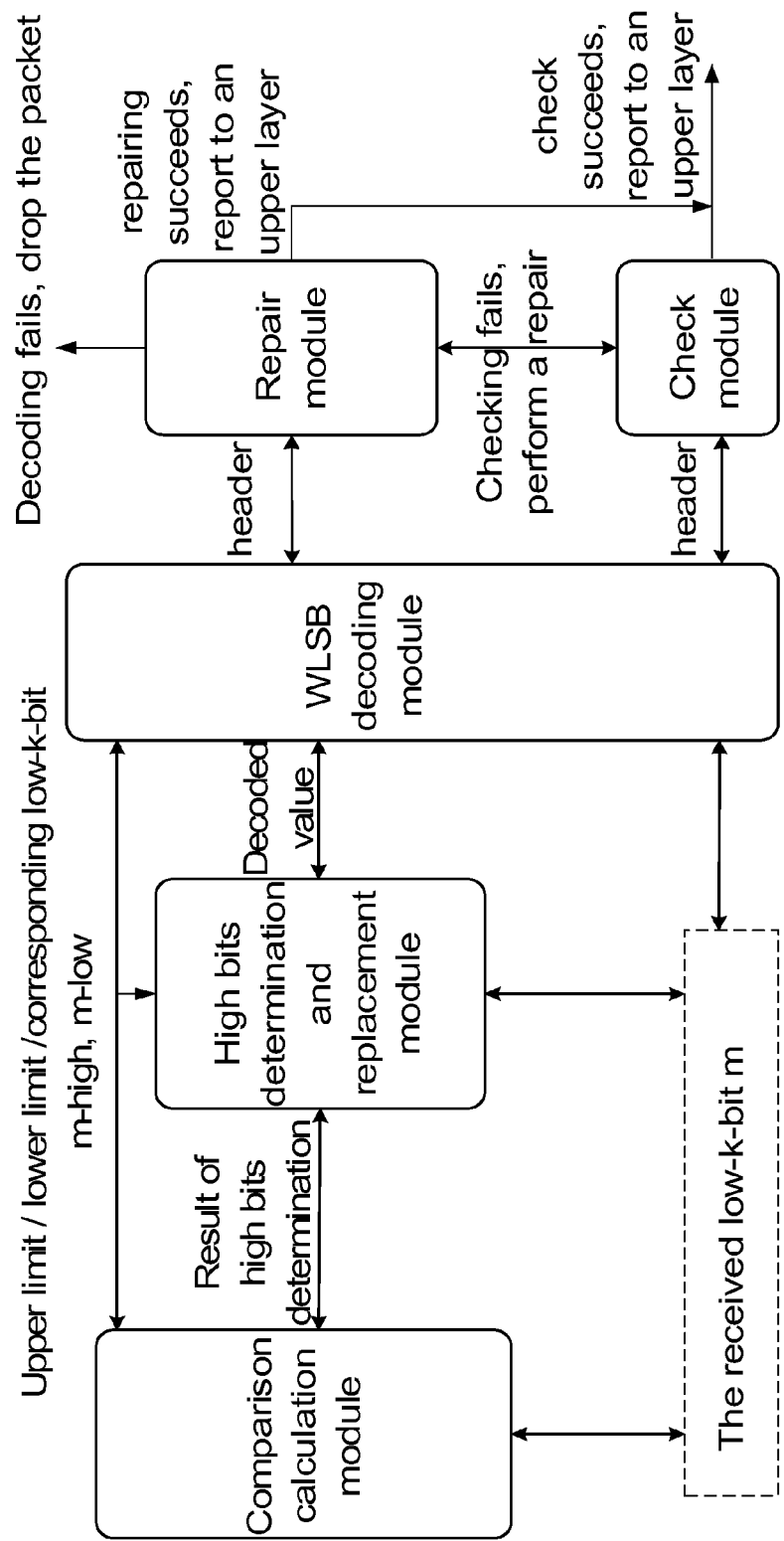
FIG. 8 is an illustration of a decoding device in an embodiment of the present invention that is used to perform decompression after header compression.

For the specific decoding methods mentioned above, the present invention also provides a device for decoding by using window-based least significant bits (WLSB) in robust header compression, as shown in FIG. 8, the device comprises:

a decompression module, which is used to receive a compressed low-k-bit m, to obtain a complete header by decoding based on an obtained decoded value, and to determine an upper limit and a lower limit of an interpretation interval and the interpretation interval itself based on local parameters; wherein a WLSB decoding algorithm is used during the decoding;

a comparison calculation module, which is used to perform comparison and calculation, to compare the low-k-bit m with the low-k bits of the upper limit or the low-k bits of the lower limit to see which is greater, to compare the decoded value with the upper limit or the lower limit to see which is greater, and to compare and calculate a difference between the low-k-bit m and the low-k bits of the upper limit or the low-k bits of the lower limit;

a high-bit determination and replacement module, which is used to judge and determine high bits based on the result of the comparison and calculation, and to construct a decoded value by replacing the low-k-bit m;

the device also includes a check module, which is used to check a header obtained through decoding by the decompression module, if the check succeeds, then it sends information obtained via decoding to an upper layer, otherwise it sends the header to a repair module for repair processing; and the device also includes a repair module, which is used to call a repair algorithm to repair the decoded value that failed in the check, if the repairing succeeds, then it sends information obtained via decoding to an upper layer, otherwise it sends back a response to failure, drops the current packet, and returns to a next lower-level compression state.

The decompression module sends the received low-k-bit m and the upper and lower limits of the determined interpretation interval to the comparison calculation module for comparison and calculation, and the comparison calculation module sends the result of the comparison to the high-bit determination and replacement module to determine the high bits and construct the decoded value, and sends the decoded value back to the decompression module to perform decoding to obtain the complete header, the decompression module sends the header to the check module for checking and, sends the header to the repair module for repairing after the checking fails.

When determining the high bits, the device for decoding by using window-based least significant bits in the robust header compression in the present invention can use the following methods:

(1) the high-bit determination and replacement module firstly, uses the received low-k-bit m to replace low-k bits of an end value in the interpretation interval to obtain a decoded value, then sends the decoded value to the comparison calculation module to determine whether the decoded value falls within the interpretation interval, if yes, then the high-bit determination and replacement module uses the decoded value as the final decoded value, otherwise, the high-bit determination and replacement module uses the m to replace low-k bits of another end value in the interpretation interval to act as the final decoded value;

for example, firstly, selecting the high bits to be identical to the high bits of the lower limit "Low", then after a simple replacement of the low bits, comparing the decoded value with the lower limit "Low" to see which is greater, if the decoded value is smaller than the lower limit and does not fall within the interpretation interval, then selecting the high bits of the upper limit "High" as the high bits of the decoded value;

(2) the comparison calculation module compares the received low-k-bit m with low-k bits of an end value in the interpretation interval to see which is greater; the high-bit determination and replacement module determines, based on the result of the comparison, whether to select the high bits of the end value or select the high bits of another end value as the high bits of the decoded value which will be combined together with the received low-k-bit m to construct a decoded value;

for example, before selecting the high bits, the comparison calculation module compares the value of the received low-k-bit m with the value of the low-k bits of the lower limit "Low" firstly to see which is greater, if the value of the low-k bits falls within the range [m_Low, $2^k-1$], then the high-bit determination and replacement module selects the high bits of the decoded value to be identical to the high bits of the lower limit "Low", otherwise it selects the high bits to be identical to the high bits of the upper limit "High";

(3) the comparison calculation module selects an endpoint value as a benchmark value, and calculates a difference between the low-k bits of the benchmark value and the received low-k-bit m, then the high-bit determination and replacement module adds the difference to or subtracts the difference from the endpoint value (adding when the endpoint value is the lower limit "Low", or subtracting when it is the upper limit "High").

For example, if the comparison calculation module selects the lower limit "Low" as a benchmark value, and then adding the difference between the received m and the value of the low-k-bit m_Low of the lower limit "Low" (doing subtraction for k bits); if the m is greater than the m_Low, then taking the high bits of the lower limit "Low" as the high bits of the decoded value directly; if the m is smaller than the m_Low, then because it is a mathematical calculation for k bits, a $2^k$ would be added during the actual calculation, and the high bits of the upper limit "High" have a carry in the $(k+1)^{th}$ bit relative to the lower limit "Low", so that the high bits of the decoded value is exactly automatically adjusted to be equal to the high bits of the upper limit to provide a correct decoded value.

The examples above for determining the high bits only selects the lower limit "Low" as a reference value, and actually, it is also practical to determine the high bits by selecting the upper limit "High" as a reference value in other similar methods.

The high bits refer to the rest of bits except low-k bits, and there are two possible situations for the high bits—being identical to the high bits of the lower limit "Low" or being identical to the high bits of the upper limit, therefore the key of decoding is comparison (comparing the high bits with the received k-bit m) and replacement (based on the result of the comparison, determining whether the low bits of the "Low" or the low bits of the "High" will be replaced, i.e. such replacement is regarding how to determine the high bits, because if it selects to replace the low-k bits of the "Low", then it means that the high bits are selected to be identical to the high bits of the "Low"), or it is also fine to reverse the procedure to replace first and then compare.

The decoding methods disclosed above in Embodiment 1 to Embodiment 6 can also be applied in the decoding device described in the present invention.

In existing protocols, no description is actually made on the entire decoding algorithm, nor is any description made that a decoding process is relative to an interpretation interval, in some existing decoding methods, a reference value "Ref" is replaced directly, but such methods are later proved to be at least incomplete or even wrong. The present invention provides an innovative decoding method, defining a decoded value on two endpoints (an upper limit and a lower limit) of an interpretation interval to perform comparison or replacement accordingly. This method is indeed very simple during a specific implementation, more particularly during a code realization process, and can avoid the ergodic method described in protocols (the protocols only describe that a value of low-k bits found in an interpretation interval that is identical to a received k-bit m will be used as a decoded value). Moreover the decoding algorithm is one of the key algorithms in the entire compression and decompression, however, there are not many methods that can provide simple decoding at present.

In all embodiments of the present invention mentioned above, the WLSB decoding algorithm always uses an SN as an example to decode, the decoding process and algorithm for a fied of an IP-ID or a TS is similar to this method, wherein the field of the IP-ID or the TS can be decoded by referring to the implementations in Embodiments 1 to Embodiment 6. Such transformation is obvious to those skilled in the art, so the various technical schemes thus obtained can also be within the scope of protection of the present invention.

INDUSTRIAL APPLICABILITY

The present invention is applicable to the technical field of mobile communications, and discloses a decoding device and method for compressing such fields as an SN in a communication network by using an ROHC scheme, in which the ROHC uses a WLSB algorithm to compress some fields that change regularly, and decodes by transferring the least significant bits of these fields and by using context of a decompressor. This invention avoids the use of inefficient ergodic methods and incorrect methods of direct replacing in low bits, and selects, based on the mathematical characteristics of the definition of interpretation intervals, to decode with a method that low bits are determined by the received k significant bits while high bits are determined jointly by local storage information and the k significant bits. The decoding method can also be used for decompression of an SN, a TS and an IP-ID in the ROHC compression.

What is claimed is:

1. A method for decoding by using window-based least significant bits in robust header compression, which is used for a decompressor to decode a parameter field sent over by a compressor, this method including the following steps:
   (1) the decompressor obtaining an upper limit and a lower limit of an interpretation interval to determine the interpretation interval based on a saved value of the parameter field successfully decoded last time which acts as a reference value and by using an offset in context;
   (2) the decompressor determining high bits of a decoded value based on a k-bit data m received from the compressor as well as the upper limit and/or the lower limit of the interpretation interval, and constructing the decoded value composed of the determined high bits and the received k-bit data m which acts as the low bits, wherein k is a natural number and indicates a number of bits of the data, and m indicates a value of the data.

2. The method according to claim 1, the method further including:
   (3) a complete header being decoded by using the decoded value determined in the step (2), and performing a check on the header, if the check succeeds, then transferring decoded information to an upper layer and updating the context.

3. The method according to claim 2, wherein, the method further includes:
   in the step (3), if the check fails, then calling a repair algorithm to perform repair processing; if the repairing succeeds, then transferring the decoded information to the upper layer and updating the context, if the repairing fails, then dropping the received packet, sending back a negative response at the same time, and returning to a next lower-level compression state.

4. The method according to claim 3, wherein the parameter field is a sequence number (SN) or a timestamp (TS) or an Internet Protocol identifier (IP-ID) of an Real-time Transport Protocol/User Datagram Protocol/Internet Protocol (RTP/UDP/IPI) header in a robust header compression (ROHC) protocol.

5. The method according to claim 4, wherein the method in the step (2) for determining the high bits of the decoded value is:
   obtaining the decoded value by using the received low-k-bit data m to replace low-k bits of an end value in the interpretation interval, then determining whether or not the decoded value falls within the interpretation interval, if yes, then taking the decoded value as the final decoded value; otherwise, then using the m to replace low-k bits of another end value in the interpretation interval to act as the final decoded value; wherein the end value is the upper limit or the lower limit.

6. The method according to claim 5, wherein the steps in the step (2) for determining the high bits of the decoded value include:
   firstly, selecting that the decoded value has the same high bits as the upper limit of the interpretation interval;
   then, obtaining the decoded value by using the received k-bit data m to replace the low-k bits of the selected upper limit; and
   then, comparing the decoded value with the upper limit to see which is greater, and based on the result of the comparison determining whether the decoded value falls within the interpretation interval, if it falls within the interpretation interval, then taking the decoded value as the final decoded value; if the decoded value is greater than the upper limit, then selecting the high bits of the lower limit as the high bits of the decoded value to construct the final decoded value.

7. The method according to claim 5, wherein the steps in the step (2) for determining the high bits of the decoded value include:
   firstly, selecting that the decoded value has the same high bits as the lower limit of the interpretation interval;
   then, obtaining the decoded value by using the received k-bit data m to replace the low-k bits of the selected lower limit; and
   then, comparing the decoded value with the lower limit to see which is greater, and based on the result of the comparison determining whether the decoded value falls within the interpretation interval, if it falls within the interpretation interval, then taking the decoded value as the final decoded value; if the decoded value is smaller than the lower limit, then selecting the high bits of the upper limit as the high bits of the decoded value to construct the final decoded value.

8. The method according to claim 4, wherein the method in the step (2) for determining the high bits of the decoded value is:
comparing the received low-k-bit data m with low-k bits of an end value in the interpretation interval to see which is greater, based on the result of the comparison determining whether to select the high bits of the end value or select the high bits of another end value as the high bits of the decoded value which will be combined together with the received low-k-bit data m to construct the decoded value; wherein the end value is the upper limit or the lower limit.

9. The method according to claim 8, wherein the steps in the step (2) for determining the high bits of the decoded value include:
firstly, comparing the value of the received k-bit data m with the value of the low-k bits of the lower limit to see which is greater;
determining based on the result of the comparison, if the m is greater than or equal to the value of the low-k bits of the lower limit, then selecting the high bits of the lower limit as the high bits of the decoded value, and obtaining the decoded value by using the received k-bit data m to directly replace the low-k bits of the lower limit of the interpretation interval; and
determining based on the result of the comparison, if the m is smaller than the value of the low-k bits of the lower limit, then selecting the high bits of the upper limit as the high bits of the decoded value, and obtaining the decoded value by using the received k-bit data m to directly replace the low-k bits of the upper limit of the interpretation interval.

10. The method according to claim 8, wherein the steps in the step (2) for determining the high bits of the decoded value include:
firstly, comparing the value of the received k-bit data m with the value of the low-k bits of the upper limit to see which is greater;
determining based on the result of the comparison, if the m is smaller than or equal to the value of the low-k bits of the upper limit, then selecting the high bits of the upper limit as the high bits of the decoded value, and obtaining the decoded value by using the received k-bit data m to directly replace the low-k bits of the upper limit of the interpretation interval; and
determining based on the result of the comparison, if the m is greater than the value of the low-k bits of the upper limit, then selecting the high bits of the lower limit as the high bits of the decoded value, and obtaining the decoded value by using the received k-bit data m to directly replace the low-k bits of the lower limit of the interpretation interval.

11. The method according to claim 4, wherein the method in the step (2) for determining the high bits of the decoded value is:
selecting an end value as a benchmark value, calculating a difference between low-k bits of the benchmark value and the received k-bit data m, then adding the difference to or subtracting the difference from the end value; wherein the end value is the upper limit or the lower limit.

12. The method according to claim 11, wherein the steps in the step (2) for determining the high bits of the decoded value include:
firstly, calculating the difference between the received k-bit data m and the low-k bits of the lower limit; and
then, determining the decoded value that is the sum of the lower limit of the interpretation interval and the difference.

13. The method according to claim 11, wherein the steps in the step (2) for determining the high bits of the decoded value include:
firstly, calculating the difference obtained by subtracting the value of received k-bit data m from the value of the low-k bits of the upper limit; and
then, determining the decoded value that is equal to a value of subtracting the difference from the upper limit of the interpretation interval.

14. The method according to claim 1, wherein, in the step (1), the lower limit and the upper limit of the interpretation interval are obtained based on the value of the parameter field successfully decoded last time which is used as the reference value "Ref", and by using the offset p in the context are, respectively:
the lower limit of the interpretation interval is Low=Ref−p;
the upper limit of the interpretation interval is High=Ref+(2^k−1)−p, wherein the "^" means exponentiation.

15. The method according to claim 2, wherein the method in the step (3) for checking the header is a cyclic redundancy check (CRC) method.

16. A device for decoding by using window-based least significant bits in robust header compression, including:
a decompression module, which is used to receive a compressed low-k-bit data m, to obtain the complete header by decoding based on an obtained decoded value, and to determine an upper limit and a lower limit of the interpretation interval and the interpretation interval itself based on local parameters; wherein a Window-Based Least Significant Bits (WLSBI) decoding algorithm is used during the decoding;
a comparison calculation module, which is used to perform comparison and calculation, to compare the low-k-bit data m with low-k bits of the upper limit or low-k bits of the lower limit to see which is greater, to compare the decoded value with the upper limit or the lower limit to see which is greater, and to compare and calculate the difference between the low-k-bit data m and the low-k bits of the upper limit or the low-k bits of the lower limit;
a high-bit determination and replacement module, which is used to judge and determine the high bits based on the result of the comparison and calculation, and to construct the decoded value by replacing the low-k-bit data m;
wherein, the decompression module sends the received low-k-bit data m and the upper and lower limits of the determined interpretation interval to the comparison calculation module for comparison and calculation, and the comparison calculation module sends the result of the comparison to the high-bit determination and replacement module to determine the high bits and to construct the decoded value, and sends the decoded value back to the decompression module to perform decoding to obtain the complete header, and
wherein k is a natural number and indicates a number of bits of the data, and m indicates a value of the data.

17. The device according to claim 16, also further including:
- a check module, which is used to check the header obtained through decoding by the decompression module, if the check succeeds, then the check module sends the information obtained via decoding to the upper layer, otherwise it sends the header to a repair module for repair processing;
- a repair module, which is used to call a repair algorithm to repair the decoded value that failed in the check, if the repairing succeeds, then the repair module sends the information obtained via decoding to the upper layer, otherwise it sends back a response to failure, drops a current packet, and returns to the next lower-level compression state;
- wherein, the decompression module sends the header to the check module for checking and, sending the header to the repair module for repairing after the checking fails.

18. The device according to claim 16, wherein the decoding device uses the following method when determining the high bits:
- the high-bit determination and replacement module uses the received low-k-bit data m to replace low-k bits of an end value in the interpretation interval firstly to obtain the decoded value; then it sends the decoded value to the comparison calculation module to determine whether the decoded value falls within the interpretation interval, if yes, then the high-bit determination and replacement module takes the decoded value as the final decoded value, otherwise, the high-bit determination and replacement module uses the m to replace low-k bits of another end value in the interpretation interval to act as the final decoded value; wherein the end value is the upper limit or the lower limit.

19. The device according to claim 16, wherein the decoding device uses the following method when determining the high bits:
- the comparison calculation module compares the received low-k-bit data m with low-k bits of an end value in the interpretation interval to see which is greater; based on the result of the comparison, the high-bit determination and replacement module determines whether to select the high bits of the end value or select high bits of another end value as the high bits of the decoded value which will be combined together with the received low-k-bit data m to construct the decoded value; wherein the end value is the upper limit or the lower limit.

20. The device according to claim 16, wherein the decoding device uses the following method when determining the high bits:
- the comparison calculation module selects an end value as a benchmark value and calculates a difference between low-k bits of the benchmark value and the received k-bit data m, then the high-bit determination and replacement module adds the difference to or subtracts the difference from the end value; wherein the end value is the upper limit or the lower limit; adding when it is the lower limit, or subtracting when it is the upper limit.

21. The method according to claim 2, wherein, in the step (1), the lower limit and the upper limit of the interpretation interval are obtained based on the value of the parameter field successfully decoded last time which is used as the reference value "Ref", and by using the offset p in the context are, respectively:
- the lower limit of the interpretation interval is Low=Ref−p;
- the upper limit of the interpretation interval is High=Ref+(2^k−1)−p, wherein the "^" means exponentiation.

* * * * *

UNITED STATES PATENT AND TRADEMARK OFFICE
CERTIFICATE OF CORRECTION

PATENT NO. : 8,418,037 B2  
APPLICATION NO. : 12/676142  
DATED : April 9, 2013  
INVENTOR(S) : Li et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 559 days.

Signed and Sealed this  
First Day of September, 2015

Michelle K. Lee  
*Director of the United States Patent and Trademark Office*